United States Patent [19]
Ryu et al.

[11] Patent Number: 5,295,836
[45] Date of Patent: Mar. 22, 1994

[54] REMOTE LECTURING SYSTEM

[75] Inventors: Tadamitsu Ryu, Kanagawa; Toshitsugu Tanida; Michio Tuchiya, both of Kawasaki, all of Japan

[73] Assignee: Fujitsu Limited, Kawasaki, Japan

[21] Appl. No.: 751,097

[22] Filed: Aug. 28, 1991

[30] Foreign Application Priority Data

Sep. 3, 1990 [JP] Japan .................................. 2-232732

[51] Int. Cl.$^5$ ............................................. G09B 7/02
[52] U.S. Cl. .................... 434/335; 434/350; 434/307; 434/322; 379/90
[58] Field of Search ............... 434/350, 307, 308, 319, 434/321, 322, 323, 335; 379/90, 92, 93

[56] References Cited

U.S. PATENT DOCUMENTS

| | | | |
|---|---|---|---|
| 3,654,708 | 4/1972 | Brudner | 434/307 |
| 3,971,141 | 7/1976 | Wilson . | |
| 4,643,682 | 2/1987 | Migler | 434/321 |
| 4,682,957 | 7/1987 | Young | 434/307 |
| 4,768,087 | 8/1988 | Taub et al. | 434/307 |
| 4,785,472 | 11/1988 | Shapiro | 434/307 |
| 4,793,813 | 12/1988 | Bitzer et al. . | |
| 4,798,543 | 1/1989 | Spiece . | |
| 5,033,969 | 7/1991 | Kamimura | 434/323 |

FOREIGN PATENT DOCUMENTS

| | | | |
|---|---|---|---|
| 2317483 | 10/1973 | Fed. Rep. of Germany | 434/307 |
| 63-173091 | 7/1988 | Japan . | |
| 0223840 | 9/1989 | Japan | 434/322 |
| 1-223840 | 9/1989 | Japan . | |
| 0059785 | 2/1990 | Japan | 434/362 |
| 0090190 | 3/1990 | Japan | 434/350 |
| 0184880 | 7/1990 | Japan | 434/307 |
| 2-200053 | 8/1990 | Japan . | |

OTHER PUBLICATIONS

Patent Abstracts of Japan, vol. 14, No. 122 (P-1017)(4065), Mar. 7, 1990; & JP-A-1316788 (Software Consultant).

Patent Abstracts of Japan, vol. 13, No. 544 (E-855)(3892), Dec. 6, 1989; & JP-A-1223840 (NEC) Jun. 9, 1989.

Funkschau, vol. 62, No. 13, Jul. 1990, Munchen, DE; E. Ihm: "Funline Ersetzt die Schulbank", *p. 39, chapter 'Der direkte Draht zum Lehrer oder Autor'; FIGS. 5-7*.

Primary Examiner—Jessica J. Harrison
Attorney, Agent, or Firm—Staas & Halsey

[57] ABSTRACT

A remote lecturing system includes a first storage for storing contents of at least one lecture of a lecturer, a second storage for storing questions and corresponding answers related to each lecture stored in the first storage, a reproducing part for retrieving from the first storage the contents of an arbitrary lecture which is requested in response to an external request from a terminal station which is operated by a student at an arbitrary time and for transferring the retrieved contents to the first terminal station, and an answer obtaining part for retrieving from the second storage an answer which corresponds to a question from the terminal station. The answer obtaining part interrupts the transfer of the contents of the arbitrary lecture from the reproducing part to the terminal station when the question is raised from the terminal station.

14 Claims, 12 Drawing Sheets

FIG.4

| QUESTIONING KEYWORD (41) | ANSWER (42) | ANSWERING LECTURER (43) | --- |
|---|---|---|---|
| NW. DMIX | FUNCTION OF DMIX IS.. | LECTURER MR. SMITH | |

FIG.5

| LECTURE NAME (51) | LECTURER (52) | TEL. NO. (53) |
|---|---|---|
| NWK DESIGN | LECTURER MR. SMITH | XXX-XXX-XXXX |

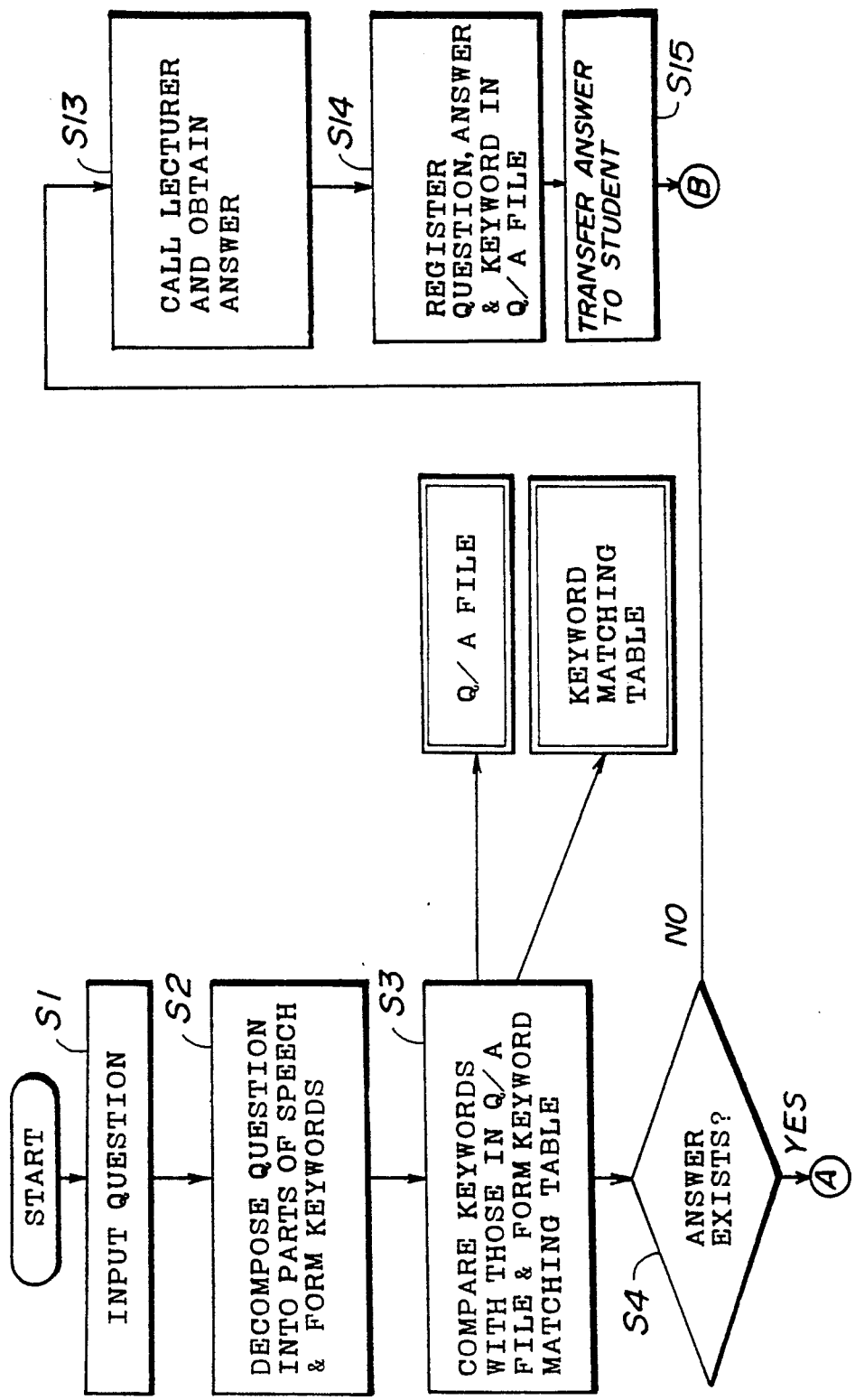

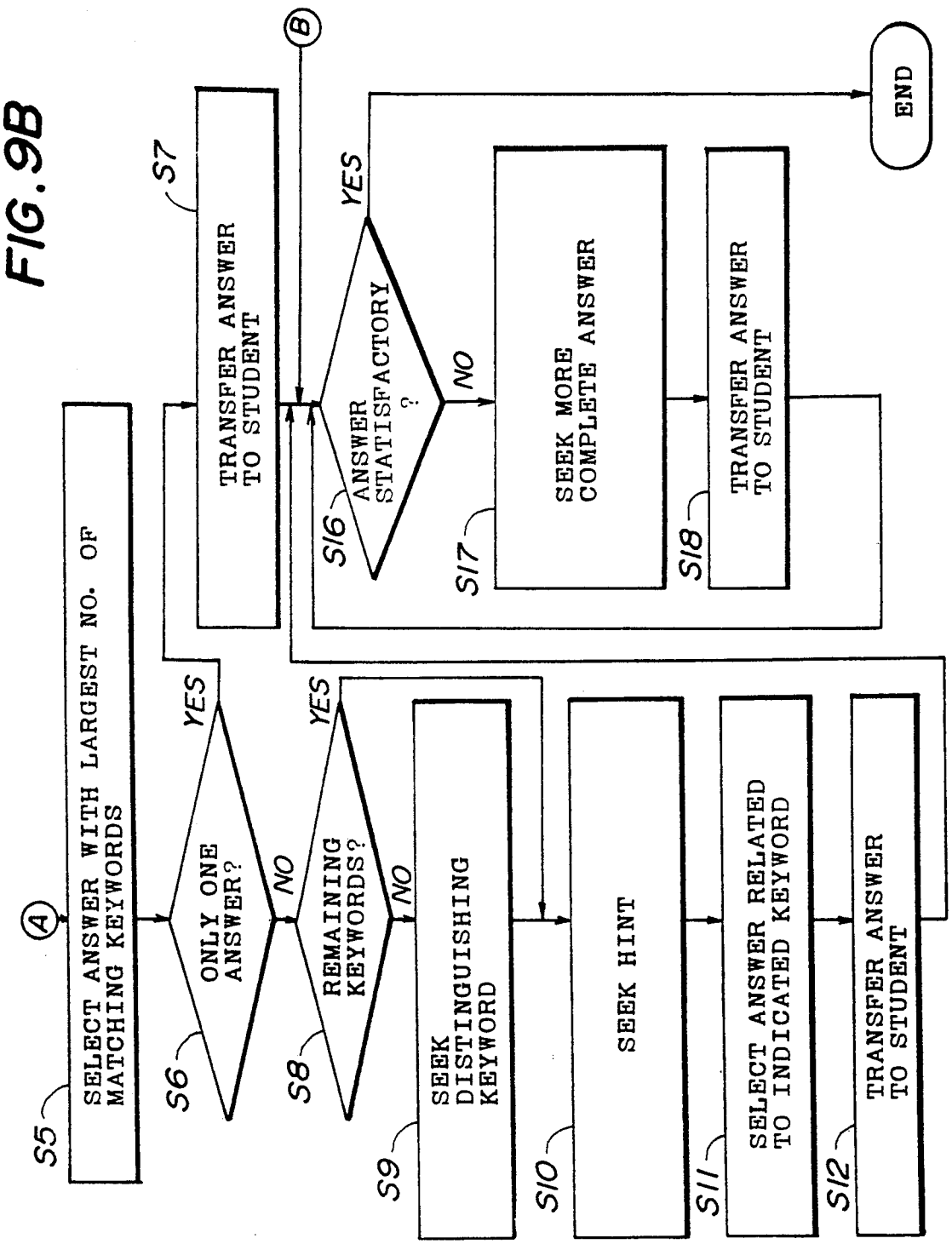

FIG.10

| QUESTION | KEYWORD GROUP | ANSWER | ANSWER NO. |
|---|---|---|---|
| (a) | (b) | (c) | "1" |
| - | (b)+Abbreviation | (d) | "3" |
| - | (b)+Definition | (e) | "5" |
| ⋮ | | | |

FIG.11

| | NO. OF MATCHING KEYWORDS | ANSWER NO. | REMAINING KEYWORDS |
|---|---|---|---|
| (A) | 4 | 3 | Abbreviation |
| (B) | 4 | 5 | Definition |
| (C) | 4 | 1 | — |
| | 2 | 20 | XXXX |
| | ⋮ | | |

REMOTE LECTURING SYSTEM

BACKGROUND OF THE INVENTION

The present invention generally relates to remote lecturing systems, and more particularly to a remote lecturing system which enables a student to receive at a station, not in real time, a lecture which is held by a lecturer.

Lecturing systems which use a communication network are becoming popular. For example, a computer-aided learning (CAL) enables a student to receive a lecture which is held by a lecturer via a communication network. However, such lecturing systems require the lecturer and the student to communicate in real time. For this reason, there are demands to realize a remote lecturing system which enables the student to receive the lecture not in real time, that is, at an arbitrary time.

The conventional remote lecturing systems may roughly be divided into two kinds. According to the first kind, the lecture held by the lecturer is transferred to the student in real time, and the student receives the audio and/or visual information of the lecture On the other hand, according to the second kind, the lecturer records the lecture on a video tape recorder (VTR) or the like, and the student later makes access to the recorded lecture at an arbitrary time.

However, according to the first kind of remote lecturing system, both the lecturer and the student must avail themselves at the same time. For this reason, this remote lecturing system lacks flexibility in that the time and day of the lecture must be determined to suit the schedules of all persons concerned, that is, the lecturer and all of the students.

On the other hand, according to the second kind of remote lecturing system, the lecturer simply needs to record the lecture, and each student can make access to the recorded lecture at an arbitrary time. Hence, the lecturer and the students have no need to make a mutually convenient time for the lecture. But since the lecture is prerecorded, there is a problem in that the student cannot obtain an answer to his question when he receives the lecture. Usually, the student will have difficulty understanding the rest of the lecture when his questions are unanswered. Therefore, the fact that the student cannot obtain an answer to his question is a big problem to the remote lecturing system.

SUMMARY OF THE INVENTION

Accordingly, it is a general object of the present invention to provide a novel and useful remote lecturing system in which the problems described above are eliminated.

Another and more specific object of the present invention is to provide a remote lecturing system comprising first storage means for storing contents of at least one lecture of a lecturer, second storage means for storing questions and corresponding answers related to each lecture stored in the first storage means, reproducing means, coupled to the first storage means, for retrieving from the first storage means the contents of an arbitrary lecture which is requested in response to an external request from a first terminal station which is operated by a student at an arbitrary time, and for transferring the retrieved contents to the first terminal station, and answer obtaining means, coupled to the second storage means, for retrieving from the second storage means an answer which corresponds to a question from the first terminal station, where the answer obtaining means interrupts the transfer of the contents of the arbitrary lecture from the reproducing means to the first terminal station when the question is raised from the first terminal station. According to the remote lecturing system of the present invention, the student can receive a desired lecture at an arbitrary time, and also obtain answers to his questions raised during the lecture in real time when possible.

Other objects and further features of the present invention will be apparent from the following detailed description when read in conjunction with the accompanying drawings.

BRIEF DESCRIPTION OF THE DRAWINGS

FIG.4 shows a Q/A file used in the first embodiment;

FIG.5 shows a table of lecturer's whereabouts;

FIGS.9A and 9B are flow charts;

FIG.10 shows a Q/A file used by the Q/A tool;

FIG.11 shows a keyword matching table used by the Q/A tool;

DESCRIPTION OF THE PREFERRED EMBODIMENTS

First, a description will be given of an operating principle of a remote lecturing system according to the present invention, by referring to FIG.1.

Figure 1:
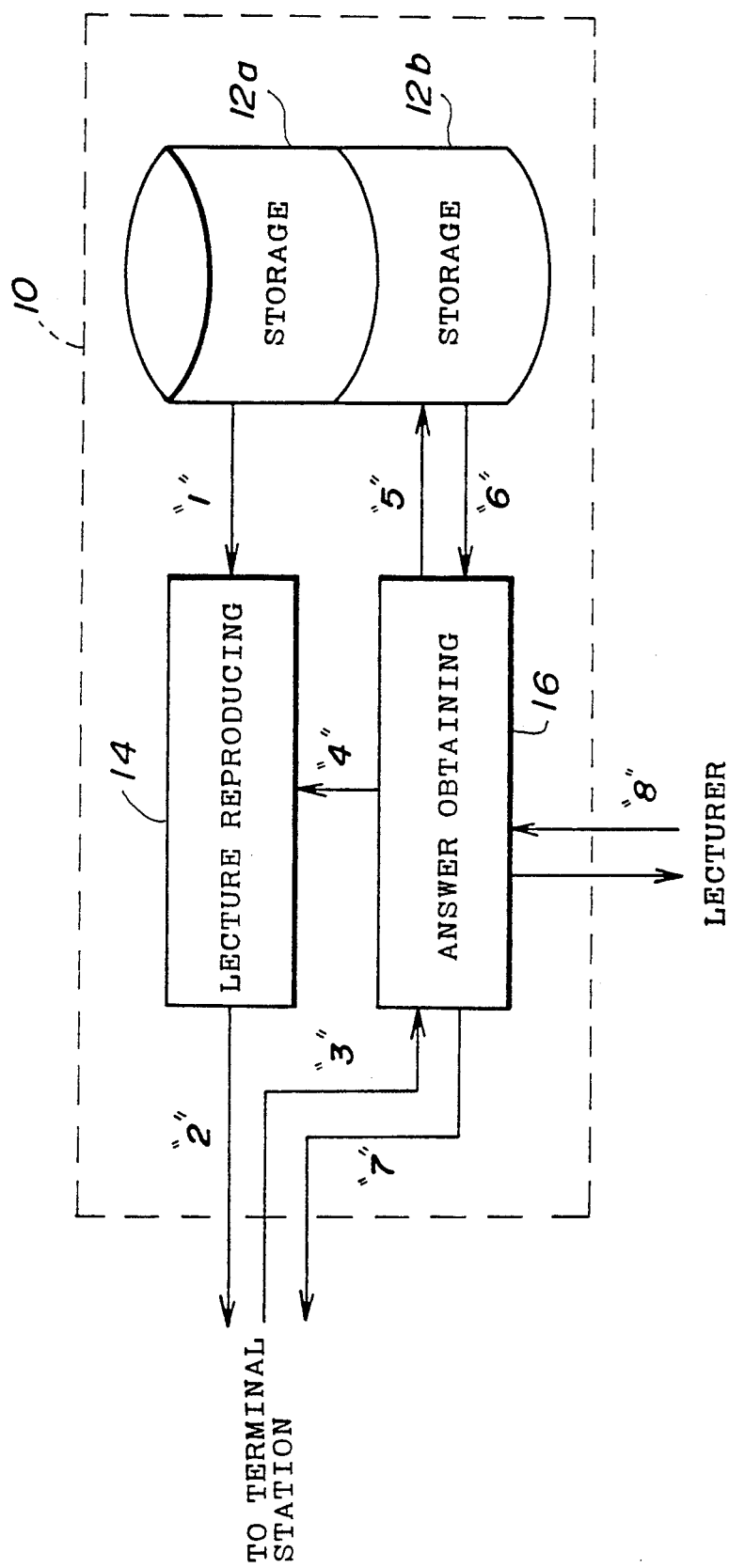
FIG.1 is a system block diagram for explaining an operating principle of a remote lecturing system according to the present invention.

In FIG.1, a center station 10 includes a first storage 12a for storing contents of lectures in a coded form, a second storage 12b for storing questions and answers in a coded form, a lecture reproducing part 14, and an answer obtaining part 16. The center station 10 is coupled to a communication line (not shown), and relays the contents of a lecture to a student not in real time, that is, at an arbitrary time, and also provides answers to questions raised by the student.

The lecture reproducing part 14 makes access to the first storage 12a and retrieves the lecture which is requested by the student. The contents of the retrieved lecture are decoded, and the reproduced contents of the lecture are transferred to a terminal station of the student via the communication line.

When the student raises a question during the lecture, the answer obtaining part 16 interrupts the lecture reproducing part 14 and makes an access to the second storage 12b. The answer obtaining part 16 retrieves the registered questions from the second storage 12b to decide whether or not the question raised by the student is already registered in the second storage 12b. If the question raised by the student is registered in the second storage 12b, the answer obtaining part 16 retrieves a corresponding answer from the second storage 12b and transfers this answer to the terminal station of the student. On the other hand, if the question raised by the student is not registered in the second storage 12b, the answer obtaining part 16 makes contact with the lecturer so that the answer can be transferred promptly to the terminal station of the student. After the answer obtaining part 16 transfers the registered answer to the terminal station of the student or makes contact with the lecturer, the answer obtaining part 16 restarts the lecture reproducing part 14 so as to continue the lecture.

For example, the student who is authorized to make access to a lecture sends a password from his terminal station to the center station 10. When the authorized student is correctly identified from the password, the lecture reproducing part 14 makes access to the first storage 12a as indicated by an arrow "1" so as to reproduce the requested lecture. The contents of the lecture are reproduced and transferred to the terminal station of the student as indicated by an arrow "2".

If the student has a question during the lecture, the student sends a password which indicates a question from his terminal station to the center station 10 as indicated by an arrow "3". When the question is correctly identified from the password, the answer obtaining part 16 interrupts the lecture reproducing part 14 as indicated by an arrow "4" so as to temporarily stop the lecture. The answer obtaining part 16 decides whether or not the question is a new question, that is, a question which is not yet registered in the second storage 12b, by making access to the second storage 12b as indicated by an arrow "5".

If the question is already registered in the second storage 12b, the answer obtaining part 16 retrieves a corresponding answer from the second storage 12b as indicated by an arrow "6", and transfers this answer to the terminal station of the student as indicated by an arrow "7". On the other hand, if the question is not registered in the second storage 12b, the answer obtaining part 16 makes contact with the lecturer and obtains the answer to the question as indicated by an arrow "8", and this answer is transferred to the terminal station of the student as indicated by the arrow "7". Of course, the lecturer may not be available immediately, and in such a case, the answer which is later obtained from the lecturer is stored in the second storage 12b so that the student can obtain the answer after the lecture, for example. After transferring the answer to the terminal station of the student or informing the student that the answer will be available later, the answer obtaining part 16 restarts the lecture reproducing part 14 so as to resume the lecture from where it was interrupted by the student's question.

Figure 2:
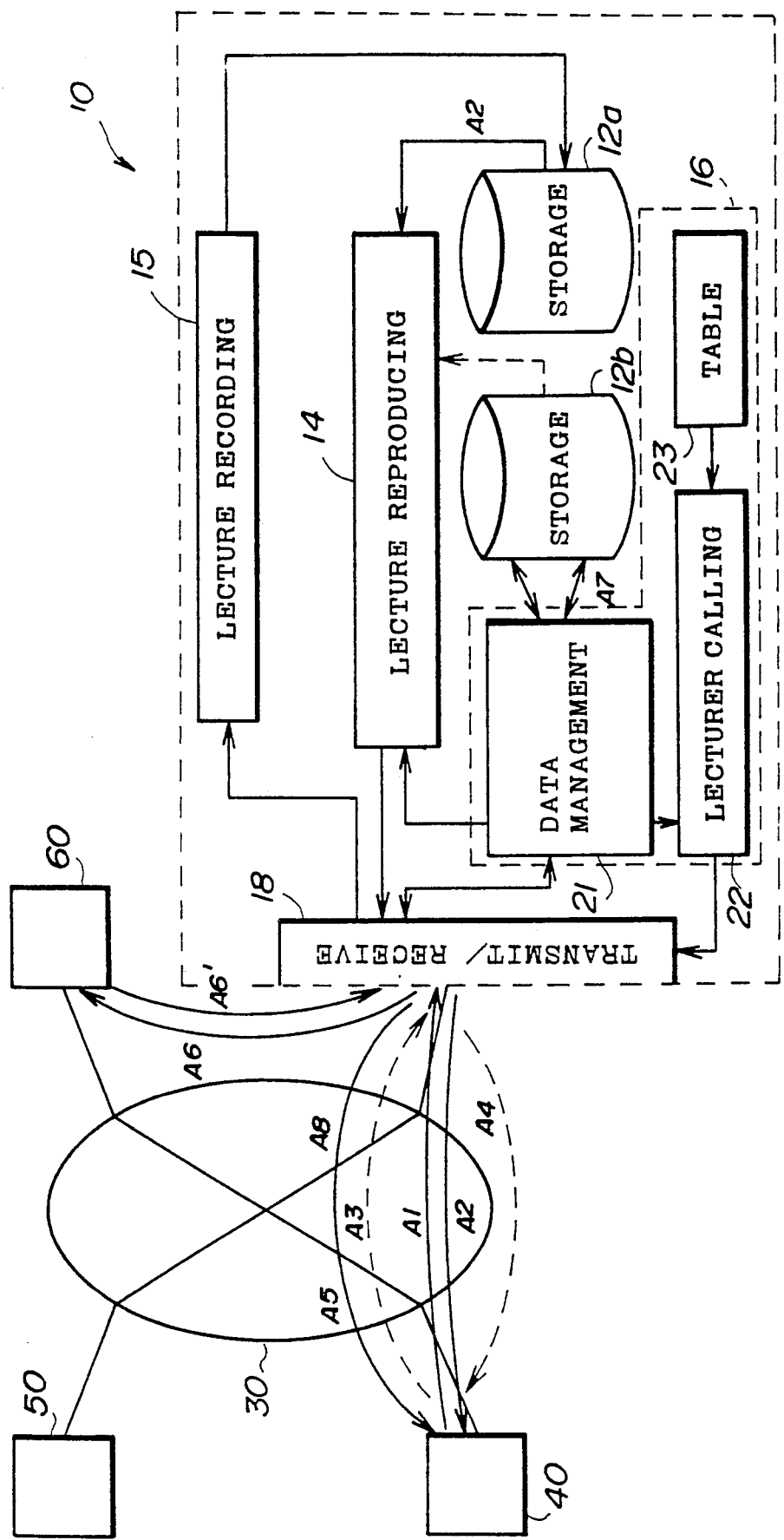
FIG.2 is a system block diagram showing a first embodiment of the remote lecturing system according to the present invention.

Next, a description will be given of a first embodiment of the remote lecturing system according to the present invention, by referring to FIG.2. In FIG.2, those parts which are the same as those corresponding parts in FIG.1 are designated by the same reference numerals, and a description thereof will be omitted.

In FIG.2, the center station 10 is coupled to terminal stations 40 and 50 of students and to a terminal station 60 of a lecturer via a communication network 30. The center station 10 includes the first and second storages 12a and 12b, the lecture reproducing part 14, a lecture recording part 15, the answer obtaining part 16 and a transmitter/receiver part 18 which are coupled as shown. The transmitter/receiver answer obtaining part 16 includes a data management part 21, a lecturer calling part 22 and a table 23 of lecturer's whereabouts.

The center station 10 can provide a lecture which is requested from the terminal station 40 or 50 of the student via the communication network 30. The center station 10 can provide the requested lectures to the independent terminal stations 40 and 50 because the contents of the lectures are stored in the first storage 12a as described above.

A lecturer may record his lecture by transmitting the lecture from the terminal station 60 to the center station 10. At the center station 10, the received lecture is supplied to the lecture recording part 15 via the transmitter/receiver 18, and the lecture recording part 15 codes the contents of the lecture. The recording part 15 then stores the contents of the lecture in the first storage 12a in the form of codes.

For example, the first storage 12a is made up of a magnetic disk unit, and the contents of the lectures are recorded on a magnetic disk of the magnetic disk unit. Similarly, the second storage 12b is also made up of a magnetic disk unit, and the questions and the corresponding answers are recorded on a magnetic disk of the magnetic disk unit. When a question made by the student is a new question and is not yet registered in the second storage 12b, the new question and a corresponding answer are additionally recorded in the second storage 12b, as will be described later.

The lecture reproducing part 14 retrieves from the first storage 12a the lecture which is requested by the student, and transmits the contents of the requested lecture to the terminal station 40 or 50 of the student. In other words, the lecture reproducing part 14 has a function of retrieving the requested lecture from the first storage 12a, a function of transmitting the contents of the requested lecture to the terminal station 40 or 50, and a function of controlling the transmission, that is, starting, interrupting and resuming the transmission of the lecture contents.

The data management part 21 of the answer obtaining part 16 has four basic functions.

The first function of the data management part 21 detects a question from the student when the student transmits a certain questioning keyword from the terminal station 40 or 50. For example, when the questioning keyword is "NW,DMIX", the first function detects this question and transmits an answer related to a function of DMIX, as will be described with regard to the third and fourth functions.

The second function of the data management part 21 interrupts the lecture reproducing part 14 when the question is detected, so as to interrupt the lecture, and searches for this question in the second storage 12b so as to decide whether or not this question is a completely new question which is not yet registered in the second storage 12b. For example, in the above described case where the student raises the question related to the function of the DMIX, the second function decides whether or not this question is new.

The third function of the data management part 21 selects the questioning keyword received from the student if the question raised by the student is decided by the second function as not being a new question, that is, decided as being already registered in the second storage 12b, and retrieves a corresponding answer to this question from the second storage 12b. In other words, the corresponding answer is retrieved from the second storage 12b by making access using the questioning keyword. The retrieved answer is transmitted to the terminal station 40 or 50 of the student via the transmitter/receiver 18. Of course, the data management part 21 may instruct the lecture reproducing part 14 to transmit the answer.

The fourth function of the data management part 21 stores the question raised by the student in the second storage 12b if the second function decides the question as being new. In addition, the data management part 21 starts the lecturer calling part 22. The lecturer calling part 22 retrieves the whereabouts of the lecturer from the table 23 which stores information related to the possible whereabouts of the lecturer including the terminal station 60 which is located near the lecturer's present location. The present location of the lecturer can be retrieved from the table 23 depending on the present time and day, for example, and the lecturer calling part 22 automatically makes contact with the lecturer via the terminal station 60. Of course, the table 23 may store the whereabouts of a plurality of lecturers, but the lecturer of the present lecture which is being provided to the student can easily be identified from the lecture.

When making contact with the lecturer, the data management part 21 transmits the new question to the terminal station 60 via the transmitter/receiver 18. Of course, the data management part 21 may instruct the lecture reproducing part 14 to transmit the new question to the terminal station 60. The lecturer prepares an answer to the new question, and transmits the answer to the center station 10.

The fifth function of the data management part 21 registers the new question and the corresponding answer which is received from the terminal station 60 in the second storage 12b. In addition, the answer to the new question is transmitted to the terminal station 40 or 50 via the data management part 21. Of course, the data management part 21 may instruct the lecture reproducing part 14 to transmit the answer to the terminal station 40 or 50.

The sixth function of the data management part 21 decides whether or not the student is satisfied with the answer supplied in response to his question. For example, it is decided that the answer satisfies the student when no further questions are raised by the student. The data management part 21 restarts the lecture reproducing part 14 when the answer satisfies the student, so as to resume the lecture from where it was interrupted by the question.

Of course, if the lecturer is not available immediately to answer the new question, the data management part 21 may inform the student that the answer to his question will be registered within a predetermined time. In this case, the student may elect to resume receiving the rest of the lecture, or resume receiving the lecture at a convenient time which is after the predetermined time so that his new question may be answered before receiving the rest of the lecture.

In any case, answers to more questions will be registered in the second storage 12b as more and more questions are raised by students who receive the lecture, and the lecture as a whole will be improved with time.

Next, a description will be given of the operation of the first embodiment, by referring to the flow chart of FIG.3.

Figure 3:
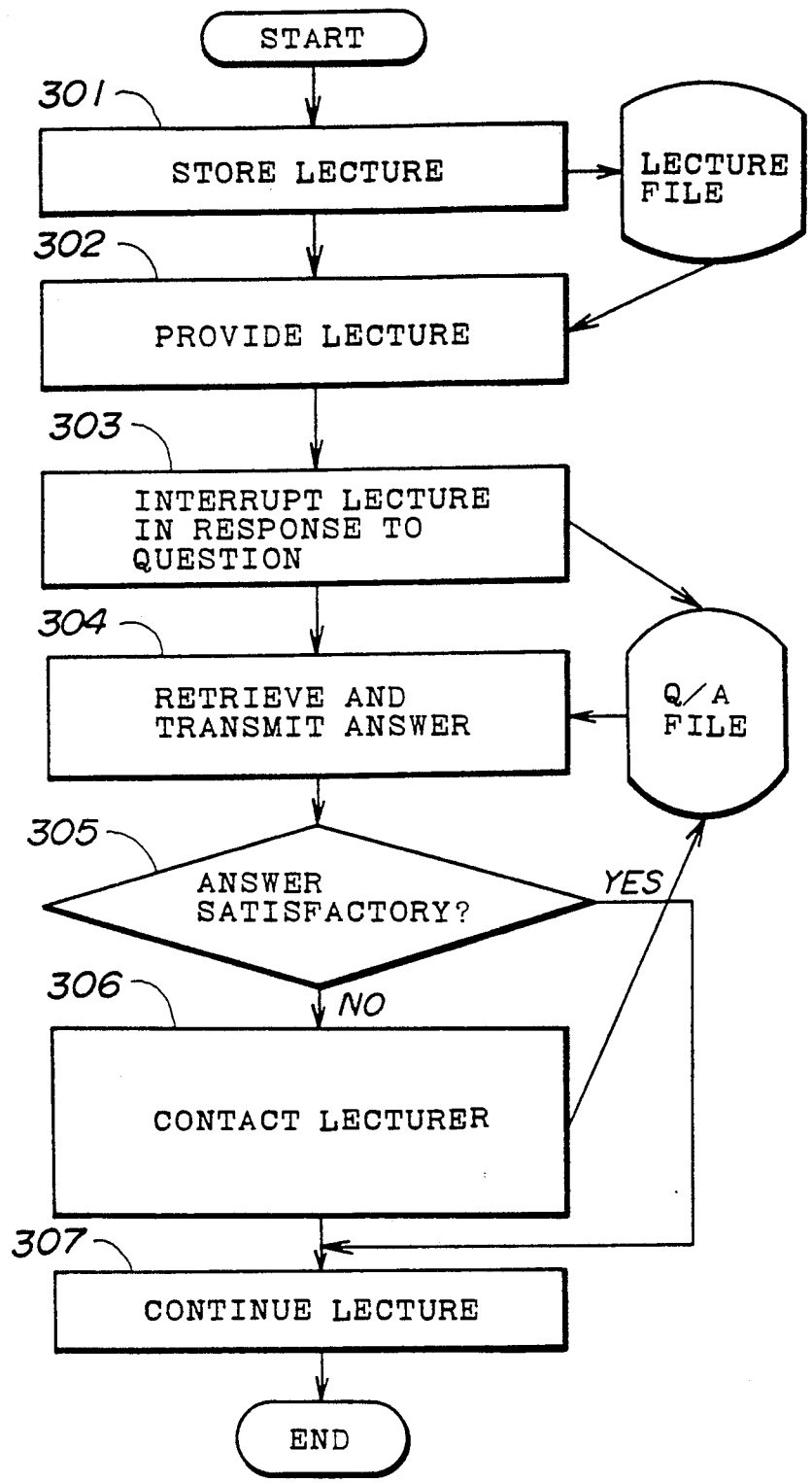
FIG.3 is a flow chart for explaining an operation of the first embodiment.

In FIG.3, a step 301 stores the contents of a lecture made by a lecturer in the first storage 12a in a form of a lecture file. This lecture file includes codes, dots, audio and video information. Hence, the first storage 12a stores a plurality of such lecture files corresponding to various lectures. For example, the contents of the lecture are transmitted from the terminal station 60 to the center station 10 via the communication network 30.

When the student makes a request to receive a lecture from the terminal station 40 as indicated by an arrow A1 in FIG.2, a step 302 provides the requested lecture to the student. The contents of the requested lecture are read from the first storage 12a and transmitted to the terminal station 40 of the student as indicated by an arrow A2 in FIG.2.

The student may raise a question during the lecture. In this case, the student sends a questioning keyword "NW,DMIX", for example, to the center station 10 as indicated by a dotted arrow A3 in FIG.2. Hence, a step 303 interrupts the lecture in response to the questioning keyword "NW,DMIX". For example, as shown in FIG.4, a Q/A file of the second storage 12b includes "NW,DMIX" which is written in a questioning keyword column 41, "function of DMIX is . . . " which is written in an answer column 42, and a "lecturer Mr. Smith" written in an answering lecturer column 43.

Hence, a step 304 collates the questioning keyword "NW,DMIX" with the questioning keywords which are registered in the questioning keyword column 41 of the Q/A file in the second storage 12b. When the matching questioning keyword "NW,DMIX" is found in the questioning keyword column 41, the step 304 retrieves the corresponding answer "function of DMIX is . . . " from the answer column 42 of the Q/A file, and transmits this answer to the student as indicated by a dotted arrow A4 in FIG.2.

After transmitting the answer to the terminal station 40 of the student, a step 305 decides whether or not the student is satisfied with the answer. For example, it may be decided that the student is satisfied with the answer when no further questions are raised by the student within a predetermined time and that the student is not satisfied with the answer when a next questioning keyword is received from the terminal station 40 within the predetermined time.

In the above described case, the answer to the student's question is already registered in the Q/A file of the second storage 12b, and thus, the decision result in the step 305 is YES. In this case, a step 307 resumes the lecture which was interrupted by the question, by transmitting the remaining contents of the lecture to the terminal station 40 as indicated by an arrow A5 in FIG.2, and the process ends after the step 307.

However, the student may not be satisfied by the answer which is provided. It may be that the answer provided does not fully answer his question, or that his question and corresponding answer are not yet registered in the Q/A file of the second storage 12b. In this case, the decision result in the step 305 is NO, and a step 306 makes contact with the lecturer by calling the terminal station 60 as indicated by an arrow A6 in FIG.2.

When the lecturer is present at the terminal station 60, the lecturer transmits the answer to the new question from the terminal station 60 to the center station 10 as indicated by an arrow A6' in FIG.2.

The lecturer may be located using the table 23 of the lecturer's whereabouts. FIG.5 shows the contents of the table 23. In FIG.5, "NWK Design" is written in a lecture name column 51, "Lecturer Mr. Smith" is written in a lecturer column 52, and a telephone number "XXX-XXX-XXXX" is written in a telephone number column 53. Accordingly, the telephone number of the terminal station 60 of the lecturer may be found from the table 23 using the lecturer's name or the lecture name.

The step 306 transmits the answer received from the terminal station 60 to the terminal station 40 of the student. In other words, when the lecturer is located immediately, the answer to the new question is transmitted to the student in real time. In addition, the step 306 registers the answer obtained from the terminal station 60 in the Q/A file of the second storage 12b together with the questioning keyword of this new question which was previously not registered, as indicated by an arrow A7 in FIG.2.

After the new question and answer are registered in the Q/A file of the second storage 12b, the step 307 resumes the lecture which was interrupted by the question, by transmitting the remaining contents of the lecture to the terminal station 40 as indicated by an arrow A8 in FIG.2, and the process ends after the step 307.

Of course, instead of advancing to the step 307 after the step 306, it is possible to return to the step 305 after the step 306.

Therefore, according to this embodiment, the student can receive a desired lecture at a desired time, that is, not in real time, because the first storage 12a within the center station 10 stores the various lectures. In addition, since possible questions and corresponding answers are stored in the Q/A file of the second storage 12b, an answer can automatically be provided to the student when he raises a question similar to one of the questions which are already stored in the Q/A file. Furthermore, if a new question is raised, the Q/A file is improved by storing the new question and the corresponding answer in the Q/A file after obtaining the answer to this new question from the lecturer.

Next, a description will be given of a second embodiment of the remote lecturing system according to the present invention, by referring to FIG.6.

Figure 6:
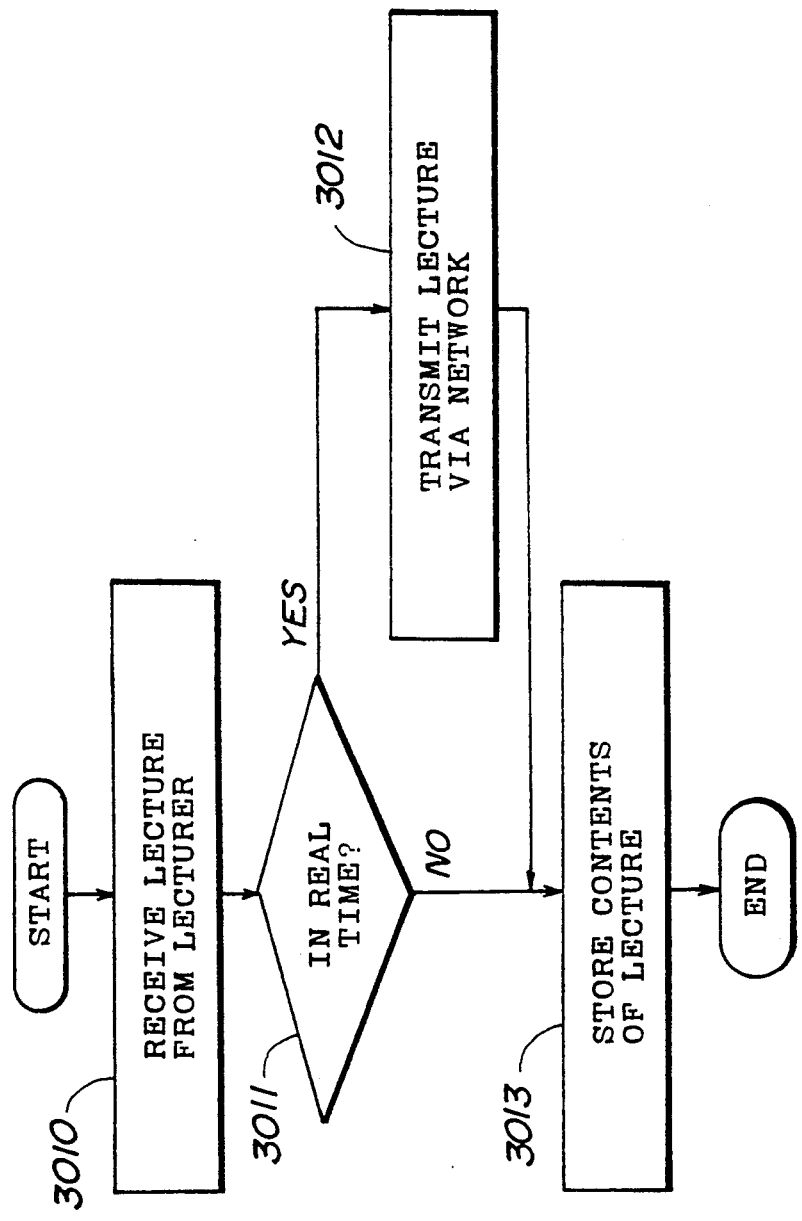
FIG.6 is a flow chart showing an essential part of the operation of a second embodiment of the remote lecturing system according to the present invention.

FIG.6 shows steps corresponding to the step 301 shown in FIG.3, and a description and illustration of the remaining steps 302 through 307 will be omitted. In FIG.6, the lecturer makes a lecture, and a step 3010 receives the lecture from the terminal station 60, for example. A step 3011 decides whether or not the lecture is to be transmitted in real time. When the decision result in the step 3011 is YES, a step 3012 starts transmitting the lecture via the communication network 30, in real time, to the concerned terminal stations 40 and 50, for example. On the other hand, when the decision result in the step 3011 is NO, or after the step 3012, a step 3013 stores the contents of the lecture in the lecture file of the first storage 12a.

Next, a description will be given of a third embodiment of the remote lecturing system according to the present invention, by referring to FIG.7.

Figure 7:
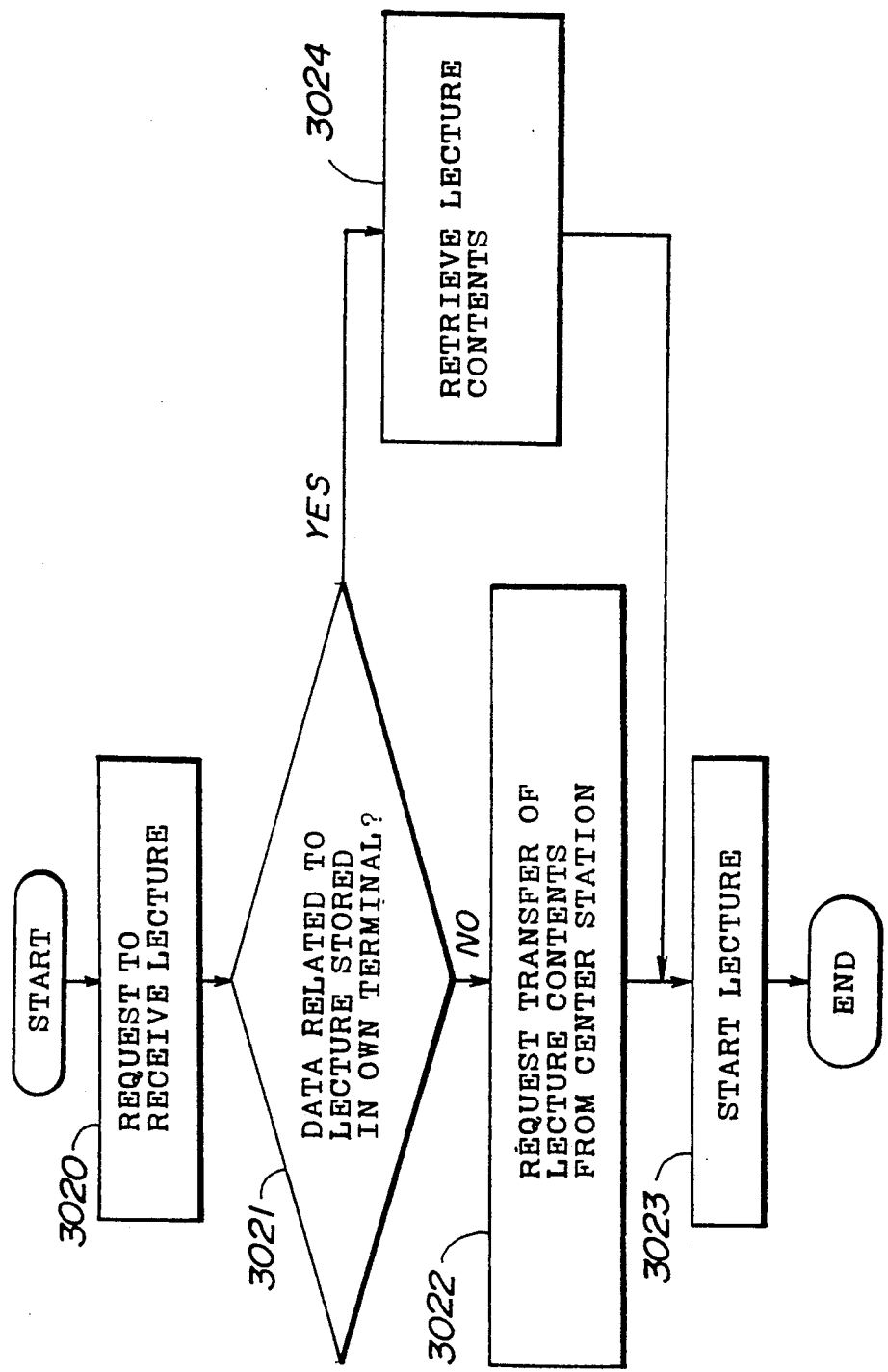
FIG.7 is a flow chart showing an essential part of the operation of a third embodiment of the remote lecturing system according to the present invention.

FIG.7 shows steps corresponding to the step 302 shown in FIG.3, and a description and illustration of the remaining steps 301 and 303 through 307 will be omitted. In FIG.7, the student makes a request from the terminal station 40, for example, to receive the desired lecture in a step 3020. A step 3021 decides whether or not data related to the desired lecture are already stored in the terminal station 40. In other words, the contents of one or a plurality of lectures may already be transferred from the center station 10 and stored in the terminal station 40, because the student may not be the first student to use the terminal station 40. When the decision result in the step 3021 is NO, a step 3022 requests transfer of the contents of the desired lecture from the center station 10 to the terminal station 40, and a step 3023 starts the desired lecture based on the contents which are transferred from the center station 10 and stored in the terminal station 40. On the other hand, when the decision result in the step 3021 is YES, a step 3024 retrieves the contents of the desired lecture which are already stored in the terminal station 40, and the step 3023 starts the desired lecture based on the previously stored contents of the desired lecture.

Next, a description will be given of a fourth embodiment of the remote lecturing system according to the present invention, by referring to FIG.8.

Figure 8:
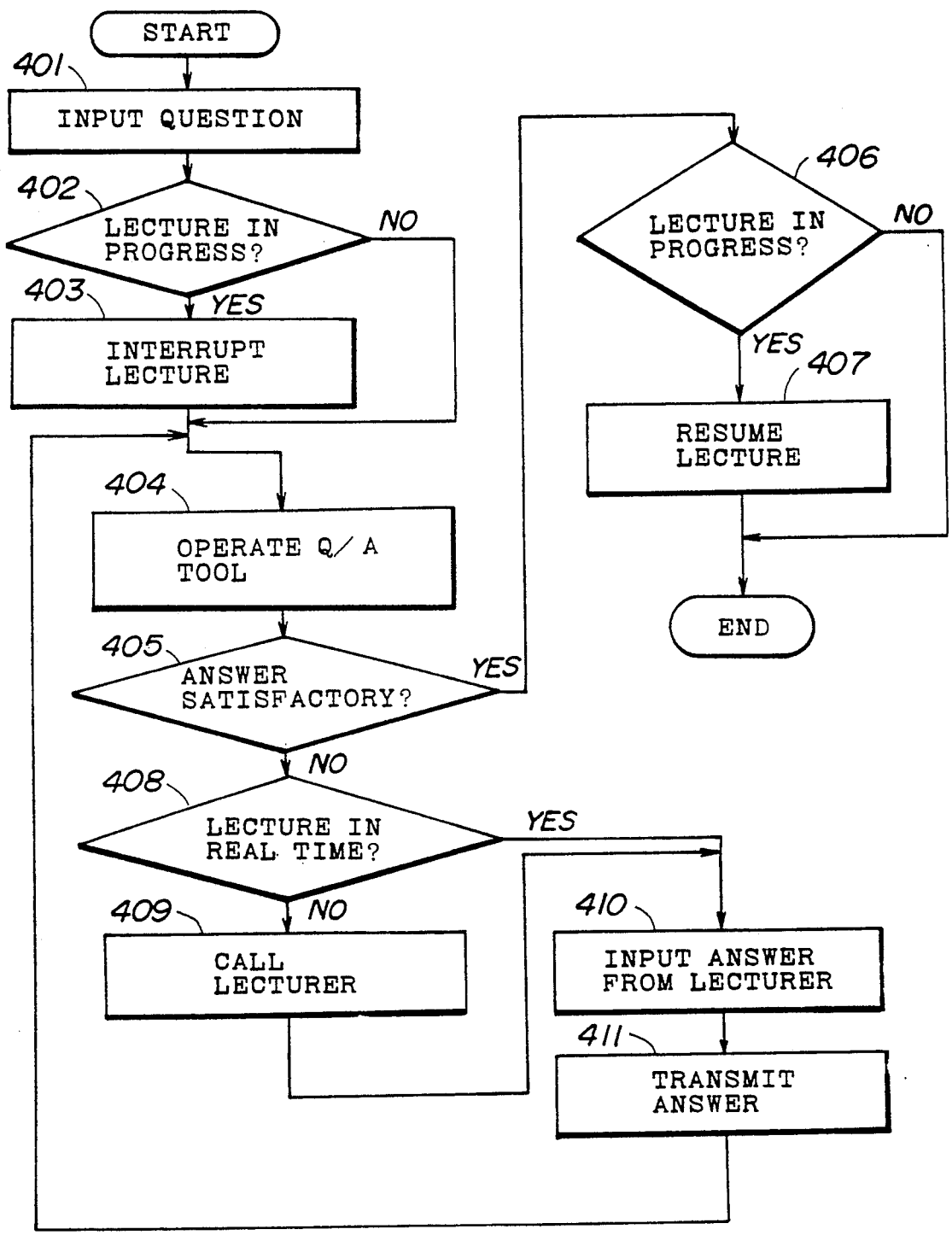
FIG.8 is a flow chart showing an essential part of the operation of a fourth embodiment of the remote lecturing system according to the present invention.

FIG.8 shows steps corresponding to the steps 303, 304, 305 and 306 shown in FIG.3, and a description and illustration of the remaining steps 301, 302, and 307 will be omitted. In FIG.8, the student raises a question and a step 401 inputs the question. A step 402 decides whether or not a lecture is being made. The lecture may be made in real time or not in real time. When the decision result in the step 402 is YES, a step 403 interrupts the lecture. After the step 403 or when the decision result in the step 402 is NO, a step 404 operates a Q/A tool. As will be described later in more detail, the Q/A tool is used to obtain a corresponding answer to the question and to transmit the answer to the student.

A step 405 decides whether or not the answer satisfies the student. When the decision result in the step 405 is YES, a step 406 decides whether or not a lecture was being made. When the decision result in the step 406 is YES, a step 407 resumes the lecture. The process ends after the step 407 or when the decision result in the step 406 is NO.

On the other hand, when the decision result in the step 405 is NO, a step 408 decides whether or not the lecture is being made in real time. When the decision result in the step 408 is NO, a step 409 calls the lecturer using the table 23 described above. On the other hand, when the decision result in the step 408 is YES or after the step 409, the lecturer provides the answer in real time and a step 410 inputs this answer from the lecturer. Then, a step 411 transmits the answer from the lecturer to the student, and the process returns to the step 404.

Next, a description will be given of an embodiment of the Q/A tool which is used in the step 404 shown in FIG.8, by referring to FIG.9.

In FIG.9, a step S1 inputs the student's question which is in the form of a natural speech. A step S2 decomposes the question into parts of speech, and forms keywords from main elements of the speech such as nouns and verbs. Then, a step S3 compares the group of keywords which are formed with keywords stored under a keyword column of a Q/A file shown in FIG.10, and forms a keyword matching table shown in FIG.11 which indicates the number of matching keywords in the Q/A file with respect to the question.

A step S4 decides whether or not an answer which corresponds to the question exists in the Q/A file. When the decision result in the step S4 is YES, a step S5 selects one or more answers which have the largest number of matching keywords. A step S6 decides whether or not there is only one answer. When the decision result in the step S6 is YES, a step S7 transfers the only answer to the student.

On the other hand, when the decision result in the step S6 is NO, a step S8 decides whether or not a remaining keyword without a match exists in the question. When the decision result in the step S8 is NO, a step S9 selects and makes contact with a lecturer who can answer the student's question and urges the lecturer to add a keyword for distinguishing the two or more answers. After the step S9 or when the decision result in the step S8 is YES, a step S10 urges the student to indicate which one of the remaining keywords is pertinent to his question, or to input a hint which would help correctly identify his question if none of the remaining keywords are pertinent. A step S11 selects the answer which is related to the keyword indicated by the student, or the hint input by the student, out of the two more candidate answers. A step S12 transfers the selected answer to the student.

On the other hand, when the decision result in the step S4 is NO, a step S13 selects and makes contact with the lecturer who can answer the student's question, and informs the lecturer of the student's question so that the lecturer may transfer an answer. A step S14 registers the new question, the corresponding answer from the lecturer and the related keywords in the Q/A file. In addition, a step S15 transfers the answer which is obtained from the lecturer to the student.

A step S16 decides whether or not the answer transferred to the student is satisfactory to the student. This step S16 is carried out after the step S7, S12, S15 or S18 which will be described later. The process ends when the decision result in the step S16 is YES. But when the decision result in the step S16 is NO, a step S17 makes contact with the lecturer and informs the lecturer of the student's question and the answer which is transferred to the student, so that the lecturer may provide a new answer which more fully answers the student's question. In this case, a new keyword is added to the new answer so that the new answer may be distinguished from the answer which was previously transferred to the student. Thereafter, the step S18 transfers the new answer to the student.

Next, a description will be given of the remaining keywords, by referring to a particular example.

For example, the student raises a question (a) which is "When and where was the intelligent network developed ?", and this question (a) is input in the step S1 shown in FIG.9. The step S2 decomposes this question (a) into a group (b) of keywords which are "When", "where", "intelligent network" and "developed". FIG.10 shows the Q/A file which is used in this particular example. The step S3 searches for matching keywords in the Q/A file shown in FIG.10, and forms the keyword matching table shown in FIG.11.

In FIG.10, an answer (c) has an answer number "1" and states "The intelligent network (IN) was developed in the United States in 1985", an answer (d) has an answer number "3" and states "The intelligent network has an abbreviation IN and was developed in the United States in 1985.", and an answer (e) has an answer number "5" and states "The intelligent network (IN) provides a control center to a public line to make it look like a leased line, and was developed in the United States in 1985.".

It may be seen from the keyword matching table that rows (A) and (B) have the largest number of matching keywords. Hence, the step S10 uses the remaining keywords to urge the student to select one of the remaining keywords which are pertinent to his question, or to input a hint which will help identify his question. In this case, the following message may be transferred to the student. "Select one keyword most pertinent to your question, and input hint if none are pertinent."
(1) Abbreviation
(2) Definition
(3) Other If the student selects the keyword (2) which is "Definition", the answer to his question is most likely in the row (B) shown in FIG.11. Thus, the answer number "5" is retrieved from the Q/A file and the corresponding answer (e) is transferred to the student. In this case, the answer (e) is "The intelligent network (IN) provides a control center to a public line to make it look like a leased line, and was developed in the United States in 1985.".

Figure 12:
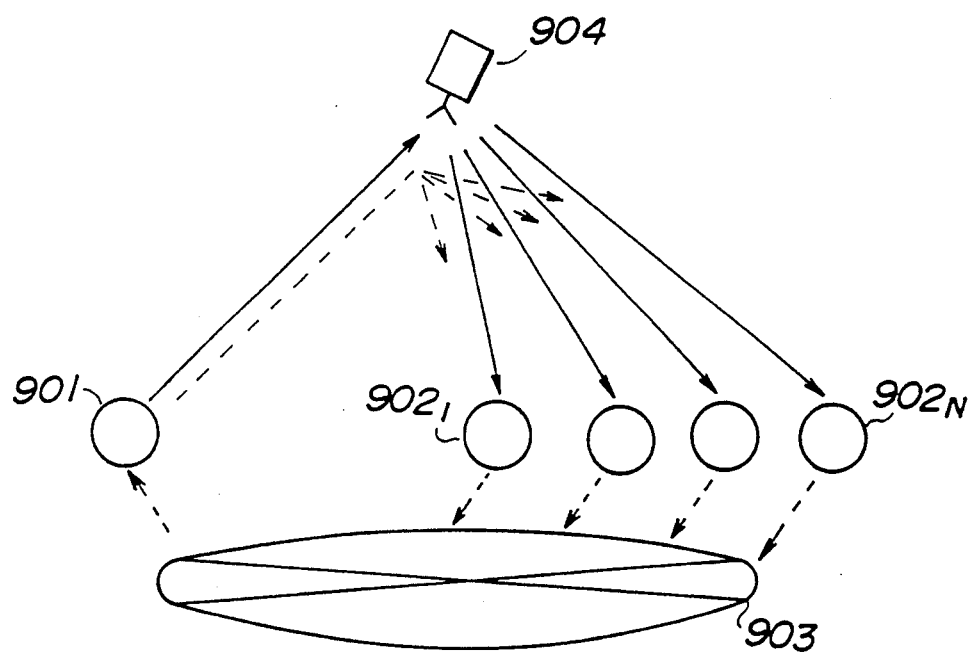
FIG.12 is a system block diagram showing a fifth embodiment of the remote lecturing system according to the present invention.

Next, a description will be given of a fifth embodiment of the remote lecturing system according to the present invention, by referring to FIG.12.

In this embodiment, a terminal station 901 of a lecturer and terminal stations $902_1$ through $902_N$ of students are coupled via a ground communication network 903. A synchronous satellite 904 functions as the center station 10 shown in FIG.2. The lecture contents are transmitted from the terminal station 901 to the satellite 904 and stored in the first storage of the satellite 904. The lecture is broadcast from the satellite 904 to all of the terminal stations $902_1$ through $902_N$.

When a student raises a question from the terminal station $902_1$, for example, this question is once transmitted to the terminal station 901 via the network 903, and the question is transmitted to the satellite 904 so that the question is broadcast to all of the terminal stations $902_1$ through $902_N$. An answer provided by the lecturer is thereafter transmitted to the satellite 904 and the answer is broadcast to all of the terminal stations $902_1$ through $902_N$. In FIG.12, solid arrows indicate the flow of the lecture contents, and dotted arrows indicate the flow of the questions and answers. According to this embodiment, all of the students become aware of a question raised by one student, and all of the students become aware of an answer provided by the lecturer in response to the question.

Next, a description will be given of a sixth embodiment of the remote lecturing system according to the present invention, by referring to FIG.13. As explained in the third embodiment in conjunction with FIG.7, a distant terminal station of the student may receive the lecture contents and the contents of the Q/A tool from the center station by a high-speed file transfer and store these contents in advance. In this case, when the student makes a request to receive a certain lecture, the terminal station simply needs to obtain from the center station contents which are related to this certain lecture and are not stored in the terminal station. In many cases, the Q/A tool is constantly revised and improved, and it is desirable to check whether or not the related Q/A tool stored in the terminal station is an updated version.

Figure 13:
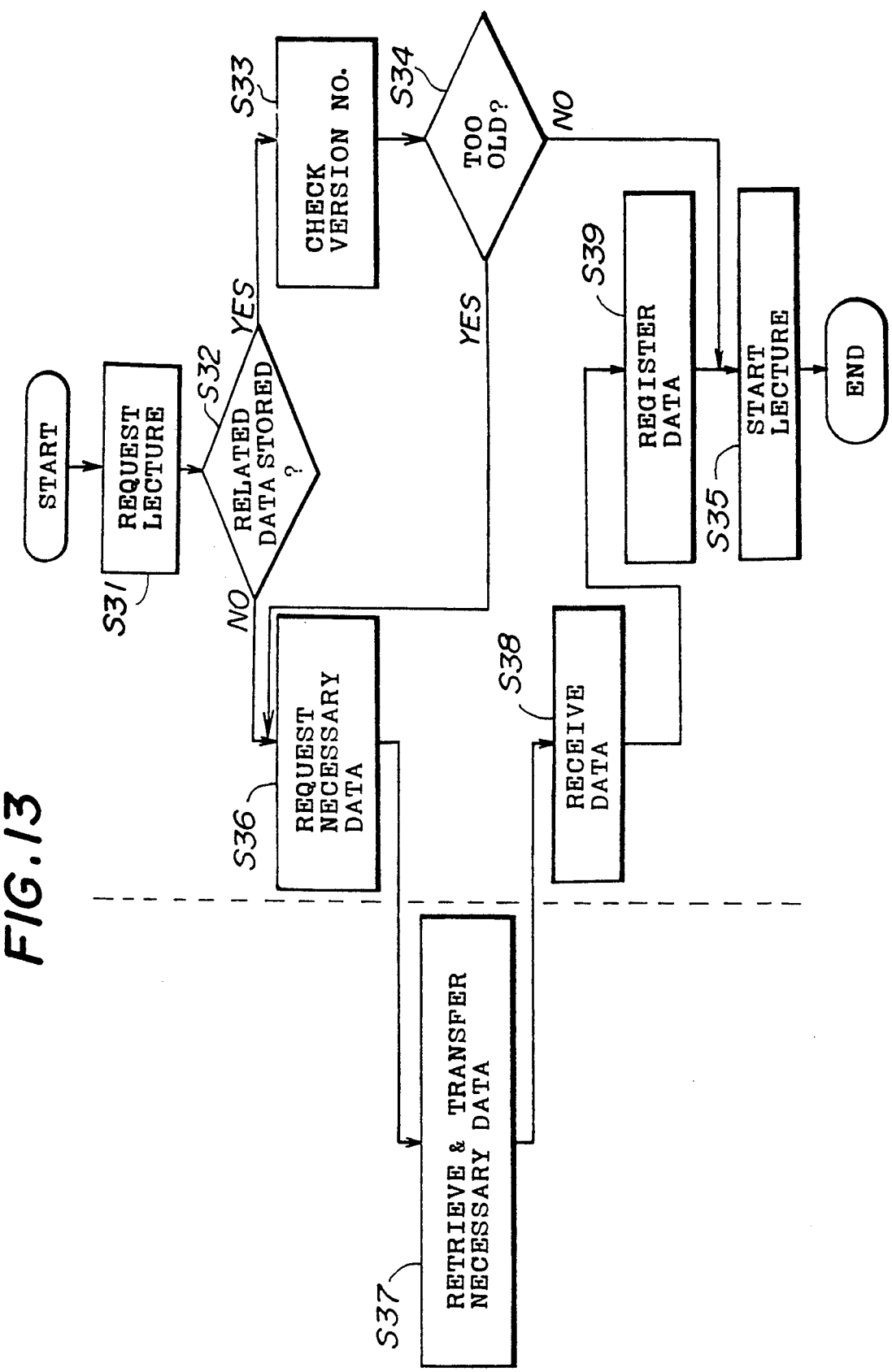
FIG.13 is a flow chart for explaining a sixth embodiment of the remote lecturing system according to the present invention.

In FIG.13, a step S31 requests the certain lecture from the terminal station. A step S32 decides whether or not the data related to the certain lecture are stored in the terminal station. When the decision result in the step S32 is YES, a step S33 checks the version number of the data related to the certain lecture. A step S34 decides whether or not the version number is too old for use. When the decision result in the step S34 is NO, a step S35 starts receiving the lecture based on the stored data in the terminal station.

On the other hand, when the decision result in the step S32 is NO or the decision result in the step S34 is YES, a step S36 requests the necessary data related to the certain lecture to the center station. At the center station, a step S37 retrieves the necessary data related to the certain lecture and transfers the data to the terminal station. At the terminal station, a step S38 receives the necessary data from the center station, and a step S39 updates the data stored in the terminal station. Thereafter, the step S35 starts receiving the certain lecture based on the newly stored data in the terminal station.

In each of the embodiments described heretofore, the number of students attending the lecture at the terminal station is of course not limited to one.

Further, the present invention is not limited to these embodiments, but various variations and modifications may be made without departing from the scope of the present invention.

What is claimed is:

1. A remote lecturing system comprising:
   first storage means for storing contents of at least one lecture of a lecturer;
   second storage means for storing questions and corresponding answers related to each lecture stored in said first storage means;
   reproducing means, coupled to said first storage means, for retrieving from said first storage means the contents of an arbitrary lecture which is requested in response to an external request from a first terminal station which is operated by a student at an arbitrary time, and for transferring the retrieved contents to the first terminal station;
   answer obtaining means, coupled to said second storage means, for retrieving from said second storage means an answer which corresponds to a question from the first terminal station, said answer obtaining means interrupting the transfer of the contents of the arbitrary lecture from said reproducing means to the first terminal station when the question is raised from the first terminal station; and
   a communication network coupled to a plurality of terminal stations, said reproducing means and said answer obtaining means being coupled to the first terminal station by way of said communication network, said reproducing means broadcasting the arbitrary lecture to the terminal stations coupled to said communication network, and said answer obtaining means broadcasting the question and the corresponding answer to the terminal stations coupled to said communication network.

2. The remote lecturing system as claimed in claim 1, wherein said answer obtaining means resumes the transfer of the contents of the arbitrary lecture from said reproducing means to the first terminal station when no further questions are raised from the first terminal station.

3. The remote lecturing system as claimed in claim 1, wherein said answer obtaining means includes calling means for automatically calling a lecturer of the arbitrary lecture when no answer corresponding to the question is retrieved from said second storage means.

4. The remote lecturing system as claimed in claim 3, wherein said calling means of said answer obtaining means transfers an answer received from the lecturer to the first terminal station.

5. The remote lecturing system as claimed in claim 4, wherein said calling means of said answer obtaining means transfers the answer received from the lecturer to the first terminal station in real time.

6. The remote lecturing system as claimed in claim 4, wherein said answer obtaining means further includes means for storing the question raised from the first terminal station in said second storage means together with the answer obtained from the lecturer.

7. The remote lecturing system as claimed in claim 6, wherein said reproducing means and said answer obtaining means are coupled to the first terminal station via a communication network, said communication network being coupled to at least a second terminal station which is operated by the lecturer.

8. The remote lecturing system as claimed in claim 7, wherein said calling means of said answer obtaining means calls the lecturer of the arbitrary lecture by calling the second terminal station via the communication network.

9. The remote lecturing system as claimed in claim 1, which further comprises recording means for recording contents of a lecture in said first storage means.

10. The remote lecturing system as claimed in claim 1, wherein said answer obtaining means collates keywords included in the question from the first terminal station with keywords of the questions and answers stored in said second storage means and retrieves a candidate answer which corresponds to a question with a largest number of matching keywords as the answer to the question from the first terminal station.

11. The remote lecturing system as claimed in claim 10, wherein, when said answer obtaining means retrieves a plurality of candidate answers corresponding to predetermined questions with the largest number of matching keywords, said answer obtaining means transfers to the first terminal station keywords of the predetermined questions not matching the keywords of the question from the first terminal station, so that a keyword most pertinent to the question from the first terminal station may be selected at the first terminal station.

12. The remote lecturing system as claimed in claim 1, wherein said first terminal station includes means for storing the contents of at least one lecture transferred from said reproducing means.

13. A remote lecturing system comprising:
   first storage means for storing contents of at least one lecture of a lecturer;
   second storage means for storing questions and corresponding answers related to each lecture stored in said first storage means;
   reproducing means, coupled to said first storage means, for retrieving from said first storage means the contents of an arbitrary lecture which is requested in response to an external request from a first terminal station which is operated by a student at an arbitrary time, and for transferring the retrieved contents to the first terminal station;
   answer obtaining means, coupled to said second storage means, for retrieving from said second storage means an answer which corresponds to a question from the first terminal station, said answer obtaining means interrupting the transfer of the contents of the arbitrary lecture from said reproducing means to the first terminal station when the question is raised from the first terminal station; and a communication network coupled to the first terminal station and at least a second terminal station which is operated by the lecturer, said first and second storage means, said reproducing means and said answer obtaining means forming a center station which is coupled to said communication network, said reproducing means and said answer obtaining means coupled to said communication network.

14. A remote lecturing system comprising:

first storage means for storing contents of at least one lecture of a lecturer;

second storage means for storing questions and corresponding answers related to each lecture stored in said first storage means;

reproducing means, coupled to said first storage means, for retrieving from said first storage means the contents of an arbitrary lecture which is requested in response to an external request from a first terminal station which is operated by a student at an arbitrary time, and for transferring the retrieved contents to the first terminal station;

answer obtaining means, coupled to said second storage means, for retrieving from said second storage means an answer which corresponds to a question from the first terminal station, said answer obtaining means interrupting the transfer of the contents of the arbitrary lecture from said reproducing means to the first terminal station when the question is raised from the first terminal station; and a ground communication network coupled to the first terminal station and a second terminal station, said first and second storage means, said reproducing means and said answer obtaining means forming a center station providing in a synchronous satellite, said center station communicating with the first terminal station and at least a second terminal station operated by the lecturer.

* * * * *

UNITED STATES PATENT AND TRADEMARK OFFICE
CERTIFICATE OF CORRECTION

PATENT NO. : 5,295,836
DATED : March 22, 1994
INVENTOR(S) : RYU et al.

It is certified that error appears in the above-indentified patent and that said Letters Patent is hereby corrected as shown below:

Col. 1, line 23, after "lecture" insert --.--.

Col. 2, line 35, after "charts" insert --for explaining an embodiment of a Q/A tool.

Col. 4, line 8, after "transmitter/receiver" insert --part 18 is coupled to the communication network 30. The--.

Col. 14, line 16, "providing" should be --provided--.

Signed and Sealed this

Twenty-seventh Day of December, 1994

Attest:

BRUCE LEHMAN

*Attesting Officer*    *Commissioner of Patents and Trademarks*